(12) United States Patent
Pleasant

(10) Patent No.: US 6,358,033 B1
(45) Date of Patent: Mar. 19, 2002

(54) MOLD INSERT

(76) Inventor: Ronald E. Pleasant, 13191 Township Rd. 184, Kenton, OH (US) 43326

( * ) Notice: Subject to any disclaimer, the term of this patent is extended or adjusted under 35 U.S.C. 154(b) by 0 days.

(21) Appl. No.: 08/395,768

(22) Filed: Feb. 28, 1995

Related U.S. Application Data

(62) Division of application No. 08/296,096, filed on Aug. 25, 1994, now abandoned, which is a continuation of application No. 07/966,813, filed on Oct. 26, 1992, now abandoned.

(51) Int. Cl.$^7$ ................................................. B29C 45/36
(52) U.S. Cl. ................... 425/192 R; 425/547; 425/577
(58) Field of Search ............................. 425/190, 192 R, 425/191, 144, 546–548, 552, 556, 569, 577, 589, 467, 468, 450.1, 451.9, 378.1, DIG. 58, DIG. 247; 249/67, 68, 139, 177, 205; 264/219; 72/467

(56) References Cited

U.S. PATENT DOCUMENTS

| | | | | |
|---|---|---|---|---|
| 793,895 A | * | 7/1905 | Monroe | 425/378.1 X |
| 2,554,378 A | * | 5/1951 | Nichols | 425/190 |
| 2,564,615 A | * | 8/1951 | Tallberg | 425/450.1 |
| 3,103,705 A | * | 9/1963 | Letica | 249/68 |
| 3,752,621 A | | 8/1973 | Shelby | 425/192 R |
| 3,986,805 A | * | 10/1976 | Haines | 425/450.1 X |
| 4,116,105 A | | 9/1978 | Herman | 29/525.2 X |
| 4,556,377 A | * | 12/1985 | Brown | 249/68 X |
| 4,828,479 A | * | 5/1989 | Pleasant | 425/192 R |
| 4,959,002 A | * | 9/1990 | Pleasant | 425/192 R |
| 5,116,450 A | * | 5/1992 | Spoo et al. | 425/192 R X |
| 5,261,806 A | * | 11/1993 | Pleasant | 425/556 X |
| 5,262,116 A | * | 11/1993 | Von Holdt, Sr. | 425/192 R X |
| 5,358,395 A | * | 10/1994 | Hane | 249/205 X |

FOREIGN PATENT DOCUMENTS

SU 1567348 5/1990 ............ 29/402.15

OTHER PUBLICATIONS

Unpublished Drawing Titled "Estimating Template" Prepared for the Accompanying Information Disclosure Statement Including a Sketch Showing a Prior Art Water Dam, Pleasant Precision, Inc., Undated.

* cited by examiner

Primary Examiner—Richard L. Chiesa
(74) Attorney, Agent, or Firm—Roger S. Dybvig

(57) ABSTRACT

A substantial barrier to flow of liquid in a circumferentially-extending liquid conduit groove of a mold insert is provided by forming recesses or undercuts by undercutting the sidewalls of the liquid conduit groove, inserting a plate-like liquid dam within the liquid conduit groove, and clamping the dam in the liquid conduit groove by the use of a pair of locking screws or pins that extend through bores in the dam into engagement with inwardly-facing surfaces of the undercuts. The relationship between the inwardly-facing undercut surfaces and the locking members is preferably such that there is a progressively increasing interfering engagement of the locking members with the undercut surfaces resulting in increasing clamping pressures applied to the dam assemblies.

18 Claims, 1 Drawing Sheet

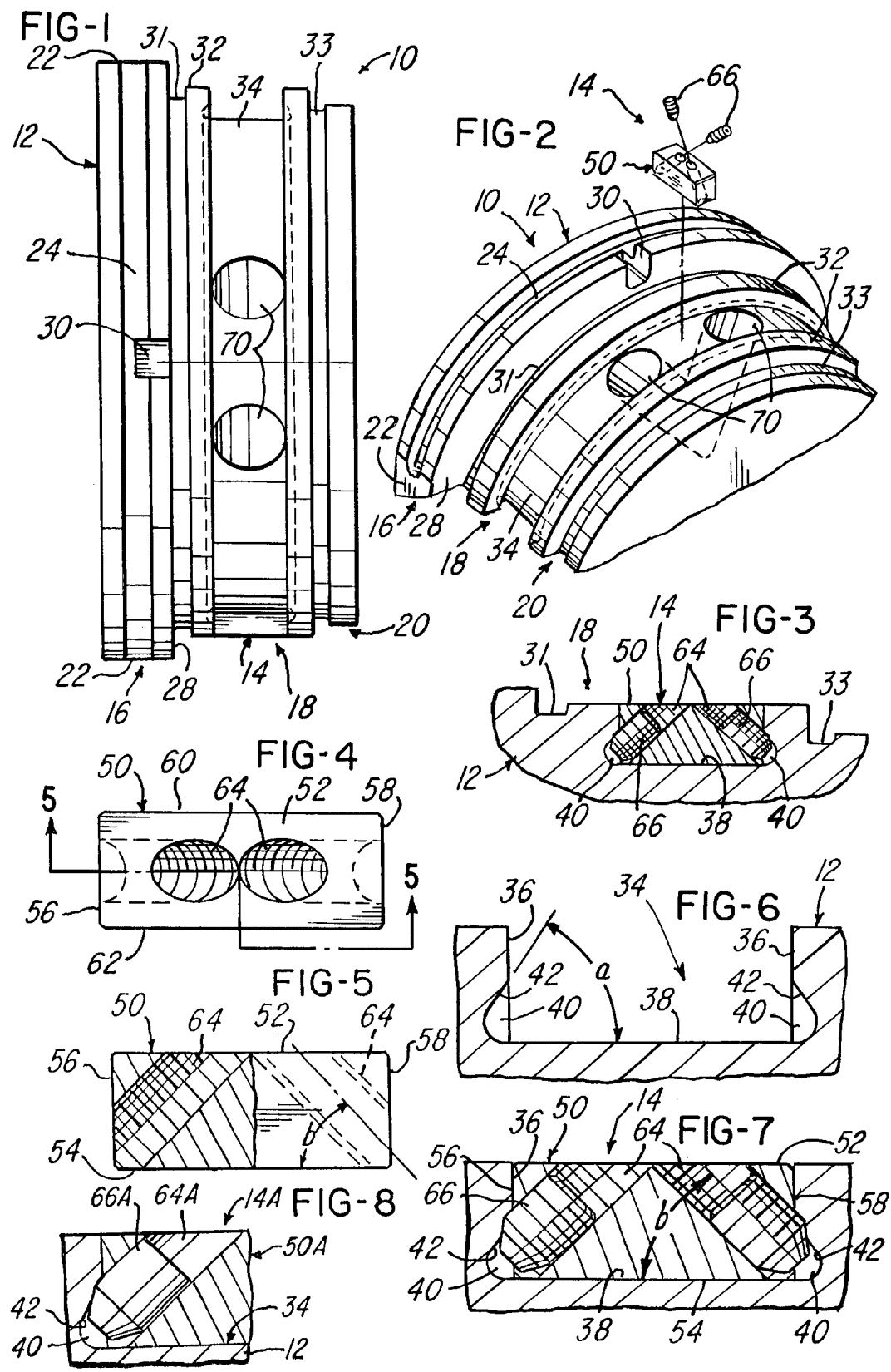

MOLD INSERT

This is a divisional of application Ser. No. 08/296,096, filed on Aug. 25, 1994, abandoned, which is a continuation of application Ser. No. 07/966,813, filed on Oct. 26, 1992, abandoned. This is also related to application no. 08/387,250, filed Feb. 13, 1995, now Pat. No. 5,647,114, and to application No. 08/392,062, filed Feb. 22, 1995.

BACKGROUND OF THE INVENTION

This invention relates to an improved mold insert. Mold inserts of the type to which this invention pertains are used in machines for injection molding plastic workpieces, but this invention may be useful in other fields, such as die casting and rubber molding.

This invention is disclosed for use with mold inserts of the type shown in my U.S. Pat. No. 4,828,479, granted May 9, 1989, and U.S. Pat. No. 4,959,002, granted Sep. 25, 1990, the disclosures of which are hereby incorporated by reference herein. (The '479 and the '002 patents are hereinafter referred to as "said patents".) Said patents disclose generally cylindrical mold inserts for injection mold machines which have a generally cylindrical liquid channel section with a liquid conduit groove extending circumferentially around the liquid channel section. A liquid barrier is located in the groove so that the groove is double-ended, one end constituting a liquid inlet end and the other end constituting a liquid outlet end. A mold machine with which an insert is used has inlet and outlet connectors aligned with the inlet and the outlet ends of the groove so that a liquid, which is usually water, can be circulated around the insert for cooling or heating portions of the insert.

The mold inserts to which said patents relate are used in matched pairs, one being mounted on an "A" plate of an injection molding machine and the other mounted on its confronting "B" plate. Proper orientation of inserts on their respective "A" and "B" plates is maintained by interfitting keys and notches. The liquid inlets and outlets for both the "A" and the "B" plates are usually located on the same side of a master frame. If one were able to look at the liquid barriers of a pair of mutually confronting inserts from the outside of a master frame, both liquid barriers would appear to be on the same side of the master frame. However, one looking at the "A" plate insert from its front face would observe that its liquid barrier is on one side of the insert and, upon looking at the "B" plate insert from its front face, would observe that its liquid barrier is on the opposite side. Thus, for example, if the liquid barrier of the "A" plate insert is located at the 3:00 o'clock position, as viewed from the front face of the insert, then the liquid barrier on the "B" plate insert would be at the 9:00 o'clock position, as viewed from its front face.

Until machined to form the shapes of the mold cavities and cores, the only difference between an insert usable with an "A" plate of a mold machine and one usable with a "B" plate for the same machine is in regard to the location of the inlet and outlet barrier. This difference creates an inventory problem for a supplier of inserts. The practice has been to inventory inserts without the barriers and to weld dams that form the barriers into the liquid grooves when the inserts are removed from inventory for use or sale. The welding operations must be carried out with care, not only to insure that each dam is installed in the proper location, but also to insure that a dam will not, during use, slide or otherwise move around in the liquid conduit groove and will not work loose while the insert cavity or core is being machined. (The machining operations are usually done, at least in part, on turning lathes which rotate the inserts at high speeds and there is a danger that a loose dam would fly away from a rotating insert and cause injury to the lathe operator.) The use of the described welding procedure is obviously inefficient and costly because it requires the availability of a skilled welder when each insert is removed from inventory in order to insure that a liquid barrier is properly formed. Of course, an option would be to inventory inserts having inlet and outlet barriers already formed. However, that would require twice the inventory to reasonably insure that there would be an adequate supply of inserts usable with "A" plates and also an adequate supply of inserts usable with "B" plates.

The user of a mold insert often drills liquid passageways extending inwardly from circumferentially-extending liquid conduit grooves to meet various cooling or heating needs. To insure an adequate flow of liquid into such inwardly directed passageways, one or more additional dams or barriers are affixed inside the peripheral liquid conduit groove. The provision of additional dams or barriers, using the present welding procedures, can be time consuming and costly.

Accordingly, there exists a need to improve the efficiency with which inserts can be inventoried and there is also a need to enable the user of an insert to quickly, accurately and securely assemble liquid dams or barriers into liquid conduit grooves of mold inserts.

SUMMARY OF THE INVENTION

An object of this invention is to provide an improved mold insert for molding machines, and a liquid dam or barrier assembly therefor, which will enable the liquid dam or barrier assembly to be easily, quickly, accurately, and securely installed without the use of special tools or machines, such as welders, into liquid conduit grooves extending peripherally around the mold insert.

Another object of this invention is to provide improved dam or barrier assemblies for use with mold inserts. More particularly, an object of this invention is to provide a self-contained dam assembly which includes means for clamping a dam body member to the inside surfaces of a liquid conduit groove in a mold insert utilizing locking members, such as screws or pins, moveable in bores in the dam body member which open to the outermost surfaces of the dam body member, the clamping of the dam assembly to the surfaces of the liquid conduit groove being accomplished by engaging the exposed heads of the locking members by a simple tool.

In accordance with this invention, a substantial barrier to the flow of liquid in a circumferentially-extending liquid conduit groove of a mold insert is provided by forming recesses or undercuts by undercutting the sidewalls of the liquid conduit groove, inserting a plate-like liquid dam body member within the liquid conduit groove, and clamping the dam body member in the liquid conduit groove by the use of locking members that extend through bores in the dam body member into engagement with inwardly-facing surfaces of the undercuts. The relationship between the inwardly-facing undercut surfaces and the locking members is preferably such that, during assembly, there is a progressively increasing interfering engagement of the locking members with the undercut surfaces resulting in increasing clamping pressures being applied to the dam assemblies.

More particularly, the bores in the dam body member extend therethrough in opposite directions from its top surface downwardly and outwardly toward its opposite sides. When assembled into a liquid conduit groove, the top surface of the dam body member becomes its radially outermost surface with respect to the longitudinal centerline of the insert. The dam is so sized and shaped that it fits entirely within the liquid conduit groove and is effective to substantially prevent the flow of liquid therepast. One such dam can be clamped within a liquid conduit groove to separate or define the liquid inlet and outlet ends thereof. One or more additional dams can readily be clamped within the liquid conduit groove to assist in forcing the liquid into passageways extending from the liquid conduit groove.

The undercuts in the sidewalls of the liquid conduit groove preferably extend completely through 360 degrees to enable them to be easily machined using a turning lathe and to enable the user to easily add dam assemblies at any desired location around the periphery of the liquid conduit groove. Each undercut preferably has sloping outermost surfaces that face inwardly toward the base surface of the liquid conduit groove at an angle relative to the base surface which is greater than the angles of the axes of the locking members relative to said base surface when a dam assembly is installed. Accordingly, when the locking members are driven into engagement with the inwardly facing undercut surfaces, the leading ends of the clamping members engage and tend to gouge into the undercut surfaces. In addition, the undercuts and the dam body members are preferably so formed that the locking members engage only the sloping outermost surfaces of the undercuts. The advancement of the locking members against the inwardly-facing undercut surfaces of the undercuts is restricted only by the interference between the locking members and the inwardly-facing undercut surfaces, the parts being so formed that the locking members never engage other surfaces of the liquid conduit groove or its undercuts.

In the presently preferred embodiment of this invention the bores in the dam body members are tapped and the locking members comprise short locking screws threadedly mounted within the tapped bores. The screws are provided with heads designed to interfit with a simple tool so that the screws can easily be advanced by rotation into interfering engagement with the inwardly-facing undercut surfaces. Substantial frictional forces are generated between the screws and the inwardly-facing undercut surfaces causing the screw threads to be bent or flattened and the undercut surfaces to be roughened so that the locking screws remain tightly engaged with the undercut surfaces and the dam assembly is securely and tightly clamped in place. The use of locking screws is preferred because they are strong and reliable yet inexpensive and simple to use. Moreover, the locking screws can readily be removed, by reverse rotation, from engagement with the undercut surfaces to enable one readily to reposition or remove and replace dam assemblies.

In a modification, the locking members comprise short locking pins which are driven by force through the dam member bores, which may be smooth and not tapped, into interfering engagement with the inwardly-facing undercut surfaces. These locking pins can readily be driven by a punch. Locking pins can also be strong, reliable, inexpensive and relatively easy to use. A drawback to their use is that dam assemblies using unthreaded pins or the like are not easily repositioned or removed. However, there may be applications in which such pins would be preferred.

Other objects and advantages will become apparent from the following description and the drawings.

BRIEF DESCRIPTION OF THE DRAWINGS

FIG. 1 is a top plan view of a partly assembled mold insert made in accordance with this invention.

FIG. 2 is a fragmentary, exploded perspective view of the mold insert body of FIG. 1 and a liquid dam assembly in accordance with this invention.

FIG. 3 is a fragmentary cross-sectional view of the mold insert of FIG. 2 with the dam assembly clamped to the insert body.

FIG. 4 is a top plan view of the dam assembly of FIGS. 2 and 3. FIG. 4 and the figures that follow are on a larger scale than FIGS. 1 through 3.

FIG. 5 is a view partly in cross section and partly in elevation of the dam assembly indicated generally by view line 5—5 of FIG. 4.

FIG. 6 is a fragmentary cross-sectional view of a portion of the mold insert body.

FIG. 7 is a fragmentary cross-sectional view of the same portion of the mold insert body illustrated in FIG. 6 and a dam assembly clamped therein.

FIG. 8 is a fragmentary cross-sectional view of a portion of a mold insert body and a modified dam assembly in accordance with this invention.

DETAILED DESCRIPTION OF THE PREFERRED EMBODIMENTS

With reference to the drawings, a mold insert in accordance with this invention is generally designated 10 and comprises an insert body, generally designated 12, and one or more dam assemblies, generally designated 14. Pairs of inserts 10 are mounted in mutually confronting relation in the "A" and "B" plates (not shown) of a master frame (not shown). As explained in said patents, the mold insert 10 may comprise either a cavity insert or a core insert. (It should be understood that the reference numbers used herein are not the same as the reference numbers applied to corresponding parts in said patents.)

Insert body 12 comprises a solid, one-piece metal body which is stepped along its length to comprise three disc-shaped, longitudinally-adjacent sections, namely a first, largest diameter, locking section, generally designated 16, a second, intermediate diameter, liquid channel section, generally designated 18, and a third, smallest diameter base section 20. As described in greater detail in said patents, the locking groove section 16 has a pair of mutually diametrically-opposed flats 22 and a pair of locking grooves 24 that extend, respectively, circumferentially between the tops of the flat 22 and the bottoms of the flats 22. (Only the upper groove 24, which extends from the top of one flat 22 to the top of the other flat 22 is shown in the drawings.) Locking groove section 16 further has a rear face or shoulder 28 that bears against a cooperating shoulder (not shown) in its associated "A" or "B" plate. As further described in said patents, the locking grooves 24 are used with retainer and lifter assemblies (not shown) which are used in the assembly and disassembly of the insert 10 with respect to its associated "A" or "B" plate. Proper orientation of the insert 10 within its associated plate is maintained by a pair of keys (not shown) that cooperate with the flats 22 and another key (not shown) that projects into a notch 30 in the outer edge of the locking section 16.

The intermediate diameter or liquid channel section 18 has a circular outer surface 32 straddled by grooves 31 and 33 used to receive O-rings (not shown) that seal the liquid channel section 16 when the insert is assembled into an "A" or a "B" plate. The circular outer surface 32 is of uniform diameter except for a peripherally-extending liquid conduit groove 34. In said patents, the liquid conduit groove is described as extending approximately 340 degrees around the periphery of the liquid channel section with the ends of the groove spaced by a barrier section. In actual practice, the groove is initially formed to extend 360 degrees around the periphery of the liquid channel section and, thereafter, the barrier is formed by welding a plate-like dam piece into the 360 degree groove.

In accordance with the present invention, the liquid conduit groove 34 is also initially formed to extend 360 degrees around the periphery of the liquid channel section 18. As best shown in FIG. 6, the liquid conduit groove 34 has a pair of sidewalls 36 and a radially innermost or bottom wall or surface 38. Circumferentially-extending recesses or undercuts 40 having sloping, radially-outermost, inwardly-facing, surfaces 42 are formed in the sidewalls 36 by undercutting the sidewalls 36 contiguous to the bottom wall 38 along their entire length. For reasons which will be discussed, the radially outermost surfaces 42 of the recesses 40 slope at an angle "a" which is greater than 45 degrees relative to the groove bottom wall 38. An angle "a" of approximately 55 degrees is acceptable.

With reference to FIGS. 3, 4, 5 and 7, each dam assembly 14 comprises a plate-like body member, generally designated 50, in the form of a rectangular parallelepiped having a top wall 52, a bottom wall 54, left and right sidewalls 56 and 58, respectively, and oppositely-directed end walls 60 and 62. A pair of threaded or tapped bores 64 extend intermediate and parallel to the ends walls 60 and 62 completely through the body member 50 in respectively opposite directions, downwardly and outwardly from its top wall or surface 52 to the intersection between its bottom wall or surface 54 and its respective left and right sidewalls 56 and 58.

Located within each of the tapped bores 64 are locking screws 66 which are sufficiently short that they do not project beyond the upper surface 52 of the dam body member 50. Locking screws 66 have Allen heads or some other shape suitable so that a simple screw driver or wrench can be used to drive the locking screws 66 by rotation into the bores 64. As illustrated in FIGS. 5 and 7, the axes of the bores 64 and, accordingly, the axes of the locking screws 66, extend at an angle "b" relative to the bottom surface 54 of dam body member 50 which is somewhat less than the angle "a", and is preferably 45 degrees.

As is evident from the drawings, the width of the dam body member 50 is substantially equal to the width of the liquid conduit groove 34 between its mutually confronting sidewalls 36. Likewise, the thickness of the body member 50, that is, the height of its sidewalls 56 and 58, is substantially equal to the depth of the groove 34. When a dam assembly 14 is clamped within the liquid conduit groove 34, the locking screws 66 are located entirely within the liquid conduit groove 34 and the dam body member 50. Accordingly, the dam assembly 14 substantially completely fills the area of the section of the groove 34 in which it is located and no part of the dam assembly 14 projects radially outwardly of the groove 34 beyond the circular outer surface 32. It may be noted that the dam body member 50, being preferably flat and in the form of a rectangular parallelepiped, will not entirely fill the section of the groove 34 and its undercuts 40 in which the dam assembly 14 is located. The locking screws 66, because they project partly into the undercuts 40, provide some additional barrier to water flow, but it is apparent that the barrier to water flow provided by a dam assembly 14 will not be perfect. However, the barrier is sufficiently complete for practical use. Of course, it is apparent that dam body members could be made to shapes other than rectangular parallelepipeds provided that the shapes are such as to substantially fill a section of the groove 34 and its undercuts 40.

In use, as shown best in FIGS. 3 and 7, a dam assembly 14 is placed within the liquid conduit groove 34 with its bottom surface 54 engaged with the groove base surface 38. When so positioned, the dam assembly 14 is located completely within the margins of the groove 34, substantially filling or spanning the entire cross-sectional area thereof. The axes of the locking screws 66 are located sufficiently close to the outermost surfaces 42 of the undercuts 40 that the locking screws 66 may be driven by rotation into engagement with such sloping outermost surfaces 42. Because the angle "b" is smaller than the angle "a", the locking screws 66 are progressively driven further into an interfering engagement with the sloping outermost undercut surfaces 42 as the locking screws 66 are driven further into the bores 64. The dam body member 50 is, therefore, effectively wedged with progressively increasing clamping forces against the bottom surface 38 of the groove 34. Thus, the dam assembly 14 is securely locked in the liquid conduit groove 34 so that it will not slide about or work loose.

The interference between the locking screws 66 and the inwardly-facing undercut surfaces 42 causes the threads on the locking screws 66 to be bent or flattened and the undercut surfaces 42 to be mutilated or roughened. As a result, the locking screws 66 tend to remain tightly engaged with the undercut surfaces 42. The combined actions of the clamping forces described above applied to the dam body member 50 and the frictional forces between the interengaged locking screws 66 and undercut surfaces 42 cause the dam assembly 14 be reliably, securely and tightly clamped within the liquid conduit groove 34.

An advantage of the dam assembly 14 is that, although retraction of the locking screws 66 from the undercut surfaces 42 is frictionally resisted, the locking screws 66 can be retracted by rotation, again with the use of a suitable tool, to permit removal of the dam assembly 14. This offers the advantage that one may reposition a dam assembly 14, should that be desired, or one may remove and replace a dam assembly 14. As is evident, it would be easier and quicker to remove or replace the dam assemblies 14 of this invention than to remove or replace welded dam assemblies.

As shown best in FIG. 7, the bores 64 are so located relative to the bottom wall 38 of the groove 34 that the locking screws 66 are spaced outwardly from the bottom wall 38 when the locking screws 66 are fully engaged with the inwardly-facing undercut surfaces 42. Accordingly, the advancement of the locking screws 66 against the inwardly-facing undercut surfaces 42 is unrestricted by other surfaces of the liquid conduit groove 34 or its undercuts 40.

FIG. 1 illustrates a dam assembly 14 fitted in the liquid conduit groove 34 used to provide a barrier for separating and defining the liquid inlet and outlet ends of the groove 34. FIG. 1 further illustrates a pair of liquid passageways 70 that extend into the insert body 12. As illustrated in FIG. 2, the passageways 70 are joined together inside the insert body 12 and their openings to the liquid conduit groove 34 are separated by another dam assembly 14 to insure that liquid flowing within the groove 34 will by diverted into and through the passageways 70.

FIG. 8 shows a modified dam assembly 14A having a dam body member 50A provided with smooth-walled (untapped) bores 64A used to provide a liquid barrier in a liquid conduit groove 34 of an insert body 12. The insert body 12 of FIG. 8 may be identical to the insert body 12 described above and illustrated in FIGS. 1, 2, 3, 6 and 7, and like parts thereof are referred to by like reference numbers. Instead of using the locking screws 66 of the previously described embodiment, the modification of FIG. 8 uses locking members in the form of locking pins 66A which are unthreaded and which are snugly or tightly received within the bores 64A. Locking pins 66A may be generally cylindrical, as illustrated in FIG. 8, but could have other cross sections, for example rectangular or hexagonal, and their outer surfaces could be roughened as by knurling.

The dam body member 50A of FIG. 8 is clamped in the liquid conduit groove 34 by driving, with the use of a punch or the like, the locking pins 66A into the bores 64A by a distance sufficient to cause the leading ends of the locking pins 66A into interfering engagement with the sloping, inwardly-facing surfaces 42 of the recesses 40. As in the previous embodiment, the axes of the bores 64A are at a lesser angle relative to the bottom wall of the dam body member 50A than the angle between the sloping inwardly-facing surfaces 42 and the base of the groove 34. Accordingly, the clamping pressure exerted on the dam body member 50A tending to lock it within the liquid conduit groove 34 is substantial and progressively increases as the locking pins 66A are driven further into engagement with the inwardly-facing surfaces 42.

Mold insert bodies have typically been made from a suitable tool steel with welded-in barriers made from cold rolled steel. Inserts have also been made with aluminum bodies and aluminum barriers. The mold insert bodies 12 of this invention may also be made from tool steels or from non-ferrous metals, such as aluminum. However, the entire dam assemblies 14 and 14A, including both the body members 50 and 50A and the locking screws 66 or pins 66A are preferably made from stainless steel since stainless steels resist deterioration due to rust or corrosion.

It will be appreciated that in both the first embodiment and in the modification of FIG. 8, a self-contained dam assembly is provided by which the dam assembly can be securely clamped within a liquid conduit groove. A simple tool, such as a screw driver or punch, used to engage the exposed heads of the locking screws or pins, is all that is needed to effectuate the clamping of the dam assembly in place.

Although this invention is disclosed for use with inserts of the type shown in said patents, it is apparent that this invention may be used with other types of mold inserts, such, for example, as inserts which are not designed to be used with retainer and lifter assemblies.

This invention can be used to improve the efficiency with which inserts can be inventoried. Because installation is quickly and easily accomplished, it is a simple matter to install the dam assemblies 14 after the inserts 10 are removed from inventory. Therefore, it is unnecessary to maintain an inventory of inserts 10 which have barriers already installed or to engage in costly welding operations when inserts are removed from inventory. The dam assemblies 14 can be delivered apart from but along with the inserts 10 to a mold making company which could install the dam assemblies 14 at a later time. Also, any person that uses an insert 10 can easily install additional dam assemblies 14 at any desired locations within its liquid conduit groove 34.

Although the preferred embodiment of this invention has been described, it will be apparent that various modifications may be made within the purview of the following claims.

I claim:

1. In a mold insert for mounting in a master frame of a molding machine, said insert comprising a solid metal body having a circumferentially-extending, outwardly-open, liquid conduit groove formed therein, the improvement wherein said groove has mutually confronting sidewalls each of which is provided with an undercut having an imperforate, sloping surface facing inwardly of said insert for clamping engagement by one or more locking elements for mounting one or more liquid barrier dam assemblies in said groove.

2. The improvement of claim 1 wherein said undercuts extend along the entire circumference of said liquid conduit groove.

3. In a mold insert for mounting in a master frame of a molding machine, said insert having a circumferentially-extending liquid conduit groove, the improvement wherein said groove has mutually confronting sidewalls each of which is provided with an undercut having a surface facing inwardly of said insert for mounting one or more liquid barrier dam assemblies in said groove, and wherein at least one barrier dam assembly is mounted in said groove, said barrier dam assembly comprising a body member of a size and shape to fit entirely within said groove, and locking elements located entirely within said groove and said body member engaged with said inwardly-facing surfaces of said undercuts.

4. The improvement of claim 3 wherein said body member and said locking elements are made from stainless steel.

5. The improvement of claim 3 wherein said locking elements comprise screws.

6. The improvement of claim 3 wherein said locking elements comprise locking pins.

7. The improvement of claim 3 wherein said inwardly-facing surfaces slope outwardly of the sidewalls of said groove and inwardly of said insert.

8. The improvement of claim 3 wherein a pair of bores extend through said body member along respective axes and open to respective said undercuts, said locking elements are engaged within said bores and project from said bores into respective said undercuts, and said respective axes are sufficiently close to said inwardly-facing surfaces of said undercuts that portions of said locking elements bear against said inwardly-facing surfaces of said undercuts.

9. The improvement of claim 8 wherein said inwardly-facing surfaces slope outwardly of the sidewalls of said groove and inwardly of said insert.

10. In a mold insert for mounting in a master frame of a molding machine, said insert having a circumferentially-extending liquid conduit groove, the improvement wherein said groove has mutually confronting sidewalls each of which is provided with an undercut having a surface facing inwardly of said insert for mounting one or more liquid barrier dams in said groove; at least one barrier dam assembly mounted in said groove, said barrier dam assembly comprising a body member of a size and shape to fit entirely within said groove; and locking means located entirely within said groove and said body member engaged with said inwardly-facing surfaces of said undercuts, said locking means comprising a pair of locking screws threadedly engaged within tapped bores extending through said body member along respective axes which are sufficiently close to said inwardly-facing surfaces of said undercuts that portions of said locking screws bear against said inwardly-facing surfaces of said undercuts.

11. The improvement of claim 10 wherein each of said inwardly-facing surfaces of said undercuts slopes at an angle "a" relative to the base of said liquid conduit groove in excess of 45 degrees and wherein each of said locking screws is held within its said bore at an angle "b" relative to the bottom surface of said dam body member which is less than angle "a" so that, as said locking screws are progressively advanced toward said inwardly-facing surfaces, said locking screws engage said inwardly-facing surfaces with progressively increasing clamping forces.

12. The improvement of claim 11 wherein said angle "b" is approximately 45 degrees.

13. The improvement of claim 12 wherein said undercuts extend along the entire circumference of said liquid conduit groove.

14. The improvement of claim 10 wherein said inwardly-facing surfaces slope a outwardly of the sidewalls of said groove and inwardly of said insert.

15. In a mold insert for mounting in a master frame of a molding machine, said insert having a circumferentially-extending liquid conduit groove, the improvement wherein said groove has mutually confronting sidewalls each of which is provided with an undercut having a surface facing inwardly of said insert for mounting one or more liquid barrier dams in said groove; at least one barrier dam assembly mounted in said groove, said barrier dam assembly comprising a body member of a size and shape to fit entirely within said groove; and locking means located entirely within said groove and said body member engaged with said inwardly-facing surfaces of said undercuts, said locking means comprising a pair of locking pins engaged within bores extending through said body member along respective axes which are sufficiently close to said inwardly-facing surfaces of said undercuts that portions of said locking pins bear against said inwardly-facing surfaces of said undercuts.

16. The improvement of claim 15 wherein each of said inwardly-facing surfaces of said undercuts slopes at an angle "a" relative to the base of said liquid conduit groove in excess of 45 degrees and wherein each of said locking pins is located within its said bore at an angle "b" relative to the bottom surface of said dam body member which is less than angle "a" so that, as said locking pins are progressively advanced toward said inwardly-facing surfaces, said locking pins engage said inwardly-facing surfaces with progressively increasing clamping forces.

17. The inprovement of claim 16 wherein said angle "b" is approximately 45 degrees.

18. The improvement of claim 15 wherein said inwardly-facing surfaces slope outwardly of the sidewalls of said groove and inwardly of said insert.

* * * * *